Patented June 18, 1940

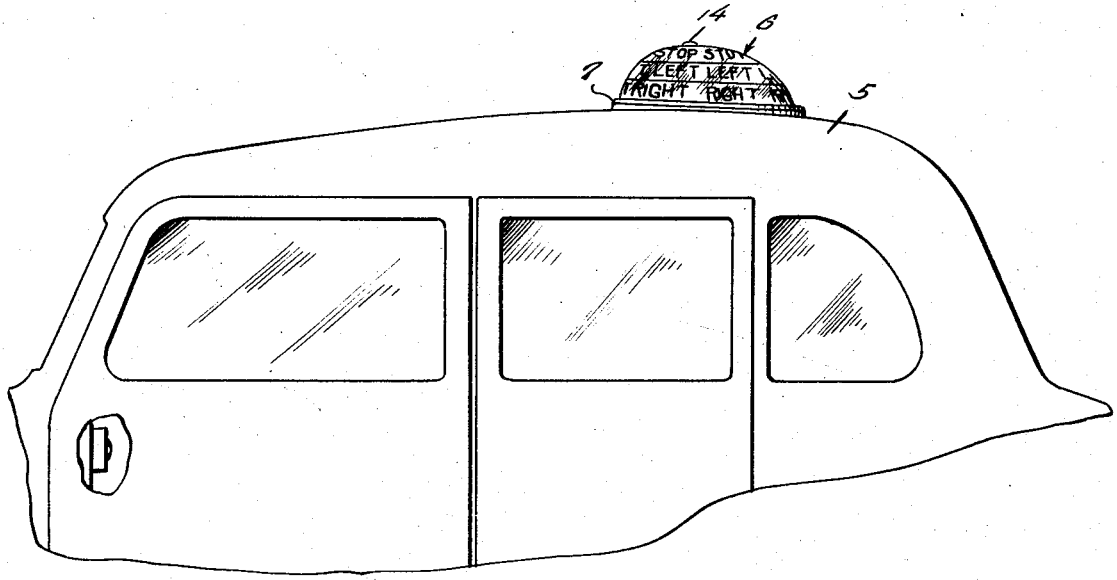
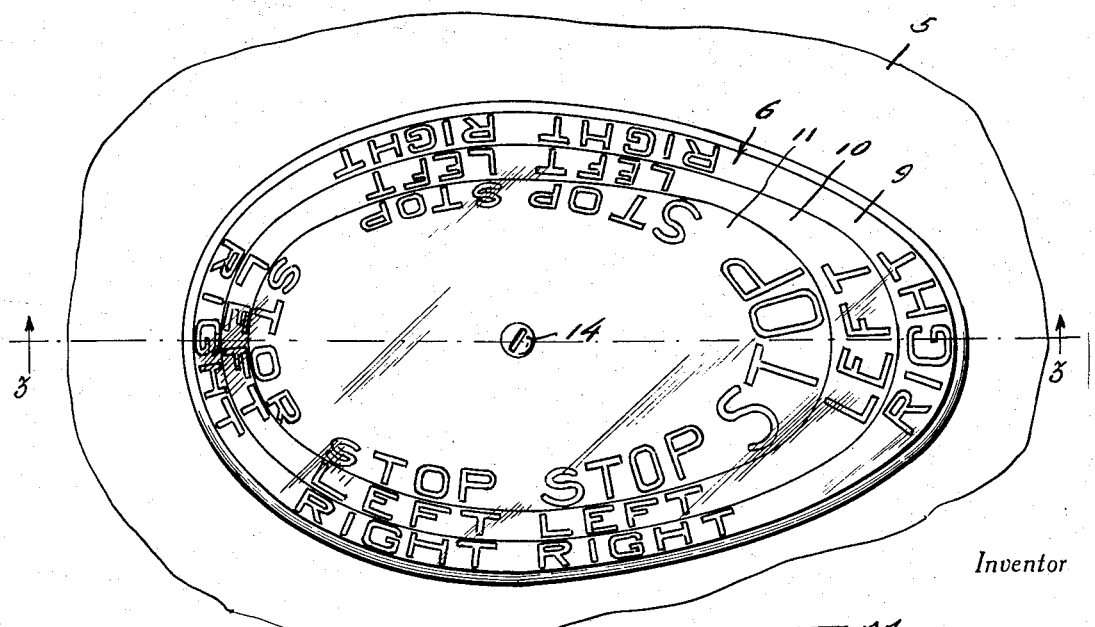

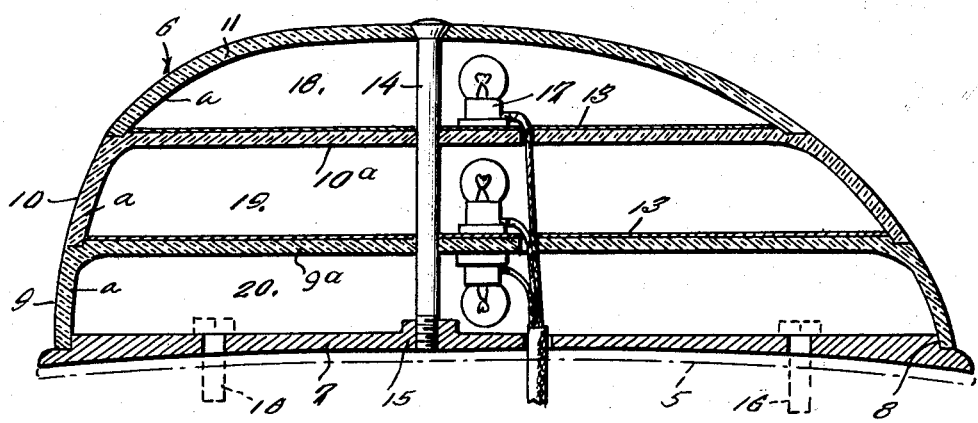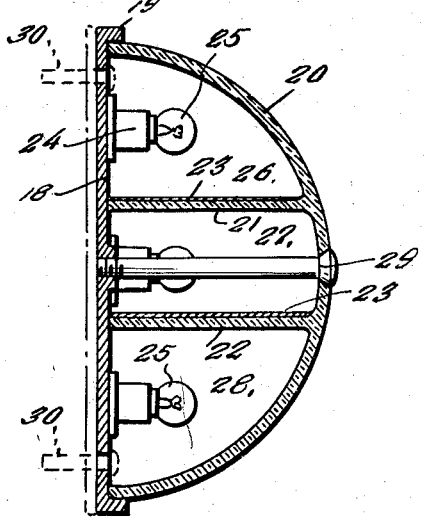

2,205,169

UNITED STATES PATENT OFFICE 2,205,169

SIGNAL STRUCTURE

Abram Hallman, Oklahoma City, Okla.

Application May 6, 1937, Serial No. 141,177

2 Claims. (Cl. 177—329)

This invention appertains to new and useful improvements in signals of the safety directional type especially adapted for use on automobiles and other vehicles.

The principal object of the present invention is to provide a signal structure of the illuminated type, displayed by both words and colors, which can be mounted conveniently on the top or upper part of automobile or other vehicle bodies.

Another important object of the invention is to provide an illuminated signal constructed in such a manner that it can be taken apart in sections in an easy and convenient manner.

Still another important object of the invention is to provide a signal structure, streamlined, of the illuminated type which will not be unsightly in use on an automobile and which in use will serve to definitely attract the attention of other motorists and pedestrians from all directions.

These and various other important objects and advantages of the invention will become apparent to the reader of the following specification.

In the drawings:

Figure 1 represents a fragmentary side elevational view of an automobile equipped with the novel signal means.

Figure 2 represents a fragmentary top plan view of an automobile top with the signal means thereon.

Figure 3 is a longitudinal sectional view through the signal means taken on a line 3—3 of Figure 2.

Figure 4 is a front elevational view of a modified form of the invention.

Figure 5 is a vertical sectional view through the structure shown in Figure 4 taken on a line 5—5 of Figure 4.

Referring to the drawings wherein like numerals designate like parts, it can be seen in Figure 1 that numeral 5 denotes the all metal top of an automobile body upon which the signal structure generally referred to by numeral 6 is mounted. This signal structure 6 consists of the base 7 of metal or some other suitable substance having its edge portion rabbeted to define a shoulder 8. The structure is divided into the sections 9, 10 and 11. These sections each consist of the endless side wall construction a, the sections 9 and 10 being formed with the horizontal partition structures 9a and 10a each provided with a suitable opaque covering or coating 13. The section 11 is more in the form of a dome of transparent material. The sections 9 and 10 and their partitions 9a and 10a, respectively, are molded from a suitable transparent material and the edge portion of each of the partitions 9a and 10a is grooved to receive the lower edge of the corresponding section 10 or 11. The dome 11 as well as the partitions 9a and 10a are provided with openings for receiving the tie bolt 14 which has a threaded end portion screwed into the boss 15 of the base 7. The base 7, in turn, is secured by bolts 16 to the vehicle top 5.

Lamp sockets 17 are mounted in the thusly constructed compartments 18, 19 and 20.

A modified form of the invention is shown in Figures 4 and 5 wherein a circular base 18 is provided with an outstanding flange 19 at its edge portion within which engages the edge portion of the hollow hemispherical-shaped dome 20 which has horizontally extending partitions 21 and 22 therein each provided with an opaque covering or coating 23. To the base 18 are secured the sockets 24 for the lamps 25, the partitions 21 and 22 dividing the interior of the dome 20 into the compartments 26, 27 and 28.

A tie bolt 29 extends through an opening in the dome 20 and is screwed into the base 18 for securing the dome 20 to the base 18 and furthermore, suitable bolt members 30 are employed for securing the base 18 to the side of the automobile body.

It is preferable, that the section 9 be suitably colored to give off a blue or green colored light, while the sections 10 and 11 be amber and red respectively.

Furthermore, suitable switch and tell tale means are necessary and should be located adjacent the driver's seat.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A signal structure comprising a base, a plurality of dish-shaped translucent structures and including a top structure, a bottom structure and an intermediate structure, said bottom structure being disposed on the base, said intermediate structure being disposed on the bottom structure and said top structure being disposed on the intermediate structure to define lamp compartments, the top portions of the bottom and intermediate structures each provided with a covering of opaque material, lamps in the said compartments and a securing element disposed through the structures and into the said base.

2. A signal structure comprising a base, a plurality of dish-shaped translucent structures and including a top structure, a bottom structure and an intermediate structure, said bottom structure being disposed on the base, said intermediate structure being disposed on the bottom structure and said top structure being disposed on the intermediate structure to define lamp compartments, the top portions of the bottom and intermediate structures each provided with a covering of opaque material, lamps in the said compartments and a securing element disposed through the structures and into the said base, the peripheral portions of the lower structure and the intermediate structure at the upper portions thereof being formed to define shouldered recesses into which the lower portions of the intermediate structure and top structure respectively seat.

ABRAM HALLMAN.